JOHN GRAY, OF SAN FRANCISCO, CALIFORNIA.

Letters Patent No. 84,877, dated December 15, 1868.

IMPROVED TILE FOR FLOORS, SIDEWALKS, &c.

The Schedule referred to in these Letters Patent and making part of the same.

*To all whom it may concern:*

Be it known that I, JOHN GRAY, of the city and county of San Francisco, State of California, have invented an Improved Tile for Sidewalks, Floors, &c.; and I do hereby declare that the ingredients used in making said tile, and the process of mixing and compounding them, to make it, with the best apparatus known to me for the purpose, are described in the following specification.

In preparing my composition for said tile, I make use of three (3) parts of common sand, as free from clay and earth as can be found. This sand, with one (1) part crude sulphur, comprises my ingredients.

The sand is first put into a heater or drier, which deprives it of all moisture, and prepares it by heating for incorporation with the sulphur. The sulphur is placed in a caldron, kettle, or other vessel of suitable capacity, under which a fire is placed which melts the sulphur. The sand is then mixed with the melted sulphur until the contents of the vessel are of about the consistency of mortar. The material is then placed in moulds of the desired size, and pressed into slabs or tiles with a hydraulic press or other power.

The slabs may be made square, oblong, or diamond-shaped, and the upper surface may be ornamented with mosaics, if desired, before pressing or drying the tile.

After a short space of time has elapsed, the tile will become dry and hard, like stone, and will be suitable for indoor or weather-tiling and paving, and can be furnished at a small cost when compared with stone or marble.

Having thus described my invention,

What I claim, and desire to secure by Letters Patent, is—

The above-described composition tile as a new article of manufacture.

In witness whereof, I have hereunto set my hand and seal.

JOHN GRAY. [L. S.]

Witnesses:
C. W. M. SMITH,
J. L. BOONE.